US012664935B2

(12) United States Patent
Jeon et al.

(10) Patent No.: US 12,664,935 B2
(45) Date of Patent: Jun. 23, 2026

(54) DISPLAY APPARATUS

(71) Applicant: LG Display Co., Ltd., Seoul (KR)

(72) Inventors: Sangmyeong Jeon, Paju-si (KR); Songyee Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/974,575

(22) Filed: Dec. 9, 2024

(65) Prior Publication Data

US 2025/0252914 A1 Aug. 7, 2025

(30) Foreign Application Priority Data

Feb. 5, 2024 (KR) ........................ 10-2024-0017189

(51) Int. Cl.
*G09G 3/3225* (2016.01)
*G09G 3/32* (2016.01)

(52) U.S. Cl.
CPC ............. *G09G 3/3225* (2013.01); *G09G 3/32* (2013.01); *G09G 2330/021* (2013.01)

(58) Field of Classification Search
CPC .. G09G 3/006; G09G 2330/12; G09G 3/3208; G09G 2330/02; G09G 2330/04; G09G 3/3233; G09G 2330/021
See application file for complete search history.

(56) References Cited

U.S. PATENT DOCUMENTS

| | | | | |
|---|---|---|---|---|
| 2017/0322608 A1* | 11/2017 | Lee | ...................... | G09G 3/3233 |
| 2019/0259328 A1* | 8/2019 | You | ...................... | G09G 3/3677 |
| 2020/0051517 A1* | 2/2020 | Kim | ...................... | G09G 3/3696 |
| 2023/0282142 A1* | 9/2023 | Lee | ...................... | G09G 3/006 |

FOREIGN PATENT DOCUMENTS

| | | |
|---|---|---|
| KR | 10-2014-0041968 A | 4/2014 |
| KR | 10-2019-0074543 A | 6/2019 |

* cited by examiner

*Primary Examiner* — Sujit Shah
(74) *Attorney, Agent, or Firm* — Morgan, Lewis & Bockius LLP

(57) ABSTRACT

A display apparatus includes: a display panel including a plurality of subpixels; a control printed circuit board including a first driving voltage line, a power management circuit, and at least one first feedback driving voltage line electrically connected to the power management circuit; a source printed circuit board electrically connected between the display panel and the control printed circuit board, the source printed circuit board including at least one second driving voltage line electrically connected to at least one of the subpixels; and at least one flexible flat cable connected between the source printed circuit board and the control printed circuit board. The first driving voltage line may be electrically connected to the at least one second driving voltage line through the at least one flexible flat cable, and the at least one first feedback driving voltage line may be electrically connected to the at least one flexible flat cable.

21 Claims, 12 Drawing Sheets

DISPLAY APPARATUS

CROSS-REFERENCE TO RELATED APPLICATION

The present application claims the benefit of and priority to Korean Patent Application No. 10-2024-0017189, filed Feb. 5, 2024, the entire contents of which are incorporated herein for all purposes by this reference.

BACKGROUND

Field

The present disclosure relates to a display apparatus.

Description of the Related Art

With the development of the information society, various demands for a display apparatus for displaying images are increasing. Various types of display apparatuses, such as a liquid crystal display, an organic light emitting diode display, etc., are being used.

A display apparatus may include a display panel, a source printed circuit board, and a control printed circuit board. The source printed circuit board and the control printed circuit board may be electrically connected through a flexible flat cable.

SUMMARY

An object of the present disclosure is to provide a display apparatus capable of determining the connection status of a flexible flat cable that connects a source printed circuit board and the control printed circuit board.

Another object of the present disclosure is to provide a display apparatus capable of determining the connection status of a plurality of flexible flat cables and of improving poor heat generation of the flexible flat cable.

The objects of the present disclosure are not limited to the above-described objects, and other objects not mentioned can be clearly understood by those skilled in the art from the following description.

To achieve these objects and other advantages of the present disclosure, as embodied and broadly described herein, a display apparatus may include: a display panel including a plurality of subpixels; a control printed circuit board including a first driving voltage line, a power management circuit, and at least one first feedback driving voltage line electrically connected to the power management circuit; a source printed circuit board electrically connected between the display panel and the control printed circuit board, the source printed circuit board including at least one second driving voltage line electrically connected to at least one of the subpixels; and at least one flexible flat cable connected between the source printed circuit board and the control printed circuit board. The first driving voltage line may be electrically connected to the at least one second driving voltage line through the at least one flexible flat cable, and the at least one first feedback driving voltage line may be electrically connected to the at least one flexible flat cable.

In another aspect of the present disclosure, a display apparatus may include: a display panel including a plurality of subpixels; a control printed circuit board including a first driving voltage line and a first feedback driving voltage line; a source printed circuit board connected to the display panel and including a second driving voltage line and a second feedback driving voltage line branched from the second driving voltage line, the second driving voltage line being electrically connected to at least one of the subpixels; and a flexible flat cable configured to connect the source printed circuit board with the control printed circuit board, to electrically connect the first driving voltage line with the second driving voltage line, and to electrically connect the first feedback driving voltage line with the second feedback driving voltage line. The control printed circuit board may be configured to sense an electrical disconnection between the first feedback driving voltage line and the second feedback driving voltage line.

Other details of example embodiments are included in the detailed description and drawings.

According to example embodiments of the present disclosure, the display apparatus may include the driving voltage line which extends from the control printed circuit board to the display panel through the source printed circuit board. On the source printed circuit board, the feedback driving voltage line may be branched from the driving voltage line. The branched feedback driving voltage line may extend again to the control printed circuit board and may be connected to the driving voltage sensing circuit of the power management integrated circuit which senses the driving voltage applied to the driving voltage line. Since the source printed circuit board and the control printed circuit board are connected through the flexible flat cable, the driving voltage lines located on each of the source printed circuit board and the control printed circuit board may be electrically connected through the drive pins of the flexible flat cable. According to example embodiments of the present disclosure, the feedback driving voltage line may be branched from the driving voltage line on the source printed circuit board, and the branched feedback driving voltage line may be electrically connected to the driving voltage sensing circuit. The driving voltage lines located on each of the source printed circuit board and the control printed circuit board may be electrically connected through the flexible flat cable. Accordingly, it is possible to determine the connection status between the flexible flat cable and the source printed circuit board, and between the flexible flat cable and the control printed circuit board.

Also, according to example embodiments of the present disclosure, a plurality of flexible flat cables may be provided, and the above-described driving voltage lines and feedback driving voltage lines may be disposed in each flexible flat cable. A pull-up resistor may be formed on the feedback driving voltage line branched from the driving voltage line on the source printed circuit board, and a pull-down resistor may be formed between the ground and the sensing node connected to the driving voltage sensing unit. Accordingly, when a connection failure occurs in the flexible flat cable, the sensing voltage applied to the sensing node may be reduced, so that it is possible to easily determine the connection status of the plurality of flexible flat cables.

Also, in comparative examples, when the connection failure occurs in some of the flexible flat cables, current may be concentrated on the other flexible flat cables. In this case, heat generation failure may occur in the other flexible flat cables. However, according to example embodiments of the present disclosure, when the sensing voltage is reduced below the reference voltage after the connection status of the flexible flat cables is determined, the power management integrated circuit that supplies a voltage to the display panel may be turned off. Due to this, the heat generation failure of the flexible flat cable can be prevented in advance.

Also, according to example embodiments of the present disclosure, since the heat generation failure of the flexible flat cable can be prevented in advance, the lifespan of the display apparatus can be improved.

Advantageous effects according to the present disclosure are not limited by the foregoing description. Further, other unmentioned effects can be clearly understood from the following descriptions by those skilled in the art to which the present disclosure belongs.

Additional features and aspects of the disclosure will be set forth in the description that follows and in part will become apparent from the description or may be learned by practice of the inventive concepts provided herein. Other features and aspects of the inventive concepts may be realized and attained by the structure particularly pointed out in, or derivable from, the written description, claims hereof, and the appended drawings.

It is to be understood that both the foregoing general description and the following detailed description of the present disclosure are by way of example and are intended to provide further explanation of the disclosures as claimed.

BRIEF DESCRIPTION OF THE DRAWINGS

The accompanying drawings, which are included to provide a further understanding of the disclosure and are incorporated in and constitute a part of this application, illustrate example embodiments of the disclosure and together with the description serve to explain the principles of the disclosure. In the drawings.

DETAILED DESCRIPTION

Figure 1:
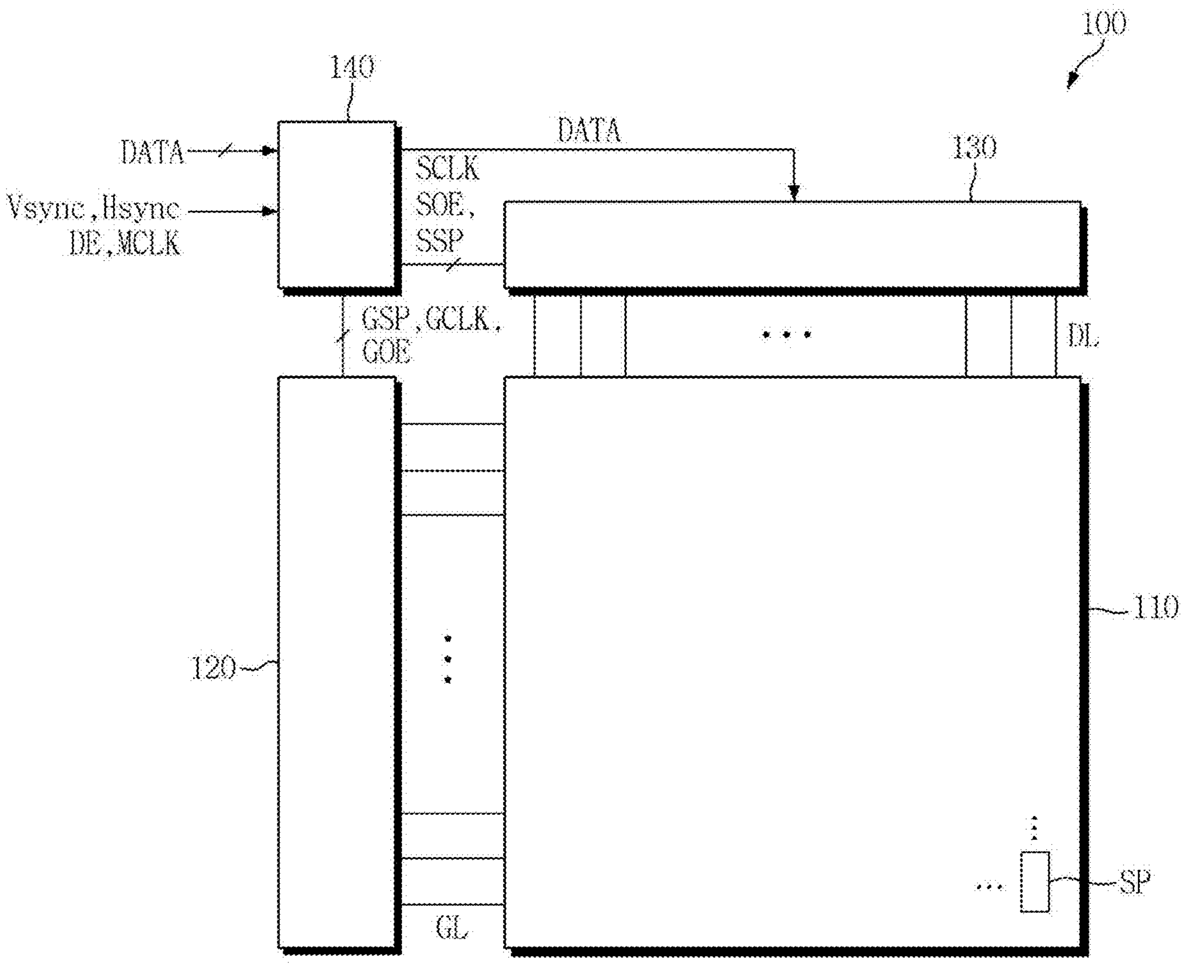
FIG. 1 is a view showing schematically a display apparatus according to a first example embodiment.

Reference will now be made in detail to various embodiments of the present disclosure, examples of which are illustrated in the accompanying drawings.

In this specification, where a component (or region, layer, portion) is described as being "on," "connected to," or "combined with" another component, the component may be directly "on," "connected to," or "combined with" the other component or may be indirectly "on," "connected to," or "combined with" the other component with a third component disposed between them.

Same reference numerals generally correspond to the same components throughout the specification, unless otherwise specified. Also, in the drawings, the thicknesses, ratios, and dimensions of the components may be exaggerated for effective or convenient description of the technical details, but the present disclosure is not limited to such illustrated details in the drawings.

A term "and/or" includes all of one or more combinations that related configurations can define.

Although terms "first," "second," and the like may be used herein to describe various elements, these elements should not be interpreted to be limited by these terms as they are not used to define a particular essence, order, sequence, precedence, or number of such elements. These terms are used only to refer one element separately from another. For example, a first element could be termed a second element, and a second element could similarly be termed a first element, without departing from the scope of the present disclosure.

An element described in a singular form may include a plurality of elements, and vice versa, unless the context clearly indicates otherwise.

Terms such as "below," "lower," "above," "upper," and the like are used to describe positional relationships between components shown in the drawings. These terms have relative concepts and describe relative positions of the components based on directions indicated in the drawings.

In the present specification, such terms as "include," "comprise," and the like are intended to identify non-exclusive characteristics, numbers, steps, operations, components, parts, or any combination thereof in examples described in the specification, and are not intended to exclude the possibility of existence or addition of one or more other characteristics, numbers, steps, operations, components, parts, or any combination thereof.

FIG. 1 is a diagram schematically showing a display apparatus according to a first example embodiment.

As shown in FIG. 1, the display apparatus 100 according to the first example embodiment may include a display panel 110 having a plurality of gate lines (GL), a plurality of data lines (DL), and a plurality of subpixels (SP) arranged in a matrix form. The display apparatus 100 may also include a gate driving circuit 120 that provides signals to the plurality of gate lines (GL), a data driving circuit 130 that supplies a data voltage through the plurality of data lines (DL), and a timing controller 140 that controls the gate driving circuit 120 and the data driving circuit 130.

The display panel 110 may display images based on a scan signal transmitted from the gate driving circuit 120 through the plurality of gate lines (GL) and a data voltage transmitted from the data driving circuit 130 through the plurality of data lines (DL).

In the case of a liquid crystal display, the display panel 110 may include a liquid crystal layer formed between two substrates and may be operated in any known mode, such as a twisted nematic (TN) mode, a vertical alignment (VA) mode, a plane switching (IPS) mode, and a fringe field switching (FFS) mode, etc. On the other hand, in the case of an organic light emitting display, the display panel 110 may be implemented by a top emission method, a bottom emission method, a dual emission method, etc.

In the display panel 110, the plurality of pixels may be arranged in a matrix form. Each pixel may be composed of subpixels (SP) of different colors, for example, a white subpixel, a red subpixel, a green subpixel, and a blue subpixel. The subpixel (SP) may be defined respectively by the plurality of data lines (DL) and the plurality of gate lines (GL).

One subpixel (SP) may include a thin film transistor (TFT) disposed in an area formed by one data line (DL) and one gate line (GL), a light emitting device such as a light emitting diode that emits light according to the data voltage, and a storage capacitor that is electrically connected to the light emitting device and maintains the data voltage.

For example, if the display apparatus 100 with a resolution of 2,160×3,840 is composed of subpixels (SP) of four colors, e.g., a white subpixel (W), a red subpixel (R), a green subpixel (G), and a blue subpixel (B), a total of 15,360 (=3,840×4) data lines (DL) may be provided. In this example, a total of 2,160 gate lines (GL) and 3,840 data lines (DL) are connected respectively to the subpixels of each of the four colors (WRGB). The subpixels (SP) may be arranged in the areas formed by the gate lines (GL) and data lines (DL).

The gate driving circuit 120 may be controlled by the timing controller 140. The timing controller 140 may control a drive timing of the plurality of subpixels (SP) by sequentially outputting scan signals to the plurality of gate lines (GL) disposed on the display panel 110.

In the example display apparatus 100 with a resolution of 2,160×3,840, when scan signals are sequentially outputted to the first gate line to the 2,160th gate line for the total of 2,160 gate lines (GL), this can be referred to as 2,160 phase operation. Alternatively, when a scan signal is sequentially outputted to in units of four gate lines (GL), for example, when a scan signal is sequentially outputted to the first gate line to the fourth gate line and then is sequentially outputted to the fifth gate line to the eighth gate line, and so on, this is referred to as a four-phase operation. In other words, when a scan signal is sequentially outputted to the gate lines (GL) in units of N number of gate lines (GL), this can be referred to as an N-phase operation.

Here, the gate driving circuit 120 may include one or more gate driving integrated circuits (GDIC), and may be disposed on one side only or on both sides of the display panel 110 depending on the driving method. Alternatively, the gate driving circuit 120 may be implemented in the form of a Gate-In-Panel (GIP) formed directly in a bezel area of the display panel 110.

The data driving circuit 130 may receive a digital image data DATA from the timing controller 140 and convert the received digital image data DATA into a data voltage in analog form. Then, the data driving circuit 130 may output the data voltage to each data line DL in accordance with a timing at which the scan signal is applied through the corresponding gate line GL, so that subpixel (SP) connected to the data line (DL) and the corresponding gate line (GL) displays a light emission signal with a brightness corresponding to the data voltage.

Likewise, the data driving circuit 130 may include one or more source driving integrated circuits (SDIC). The source driving integrated circuit(s) (SDIC) may be connected to a bonding pad of the display panel 110 by a tape automated bonding (TAB) method or a Chip-On-Glass (COG) method, or may be disposed directly on the display panel 110.

In some cases, each source driving integrated circuit (SDIC) may be integrated and disposed on the display panel 110. Also, each source driving integrated circuit (SDIC) may be implemented by a Chip-On-Film (COF) method. In this case, each source driving integrated circuit (SDIC) may be mounted on a circuit film and may be electrically connected to the data lines (DL) of the display panel 110 through the circuit film.

The timing controller 140 may supply various control signals to the gate driving circuit 120 and the data driving circuit 130 and may control the operations of the gate driving circuit 120 and the data driving circuit 130. That is, the timing controller 140 may control the gate driving circuit 120 to output a scan signal according to the timing implemented in each frame. On the other hand, the timing controller 140 may transmit the digital image data DATA received from an external source to the data driving circuit 130.

Here, the timing controller 140 may receive not only the digital image data DATA but also various timing signals from the external source (e.g., a host system) that include a vertical synchronization signal (Vsync), a horizontal synchronization signal (Hsync), a data enable signal (DE), a main clock (MCLK), etc. Accordingly, the timing controller 140 may generate a control signal by using various timing signals received from the external source and may transmit the control signal to the gate driving circuit 120 and the data driving circuit 130.

For example, the timing controller 140 may output various gate control signals including, for example, a gate start pulse (GSP), a gate clock (GCLK), and a gate output enable signal (GOE), to control the gate driving circuit 120. Here, the gate start pulse (GSP) controls the timing at which one or more gate driving integrated circuits (GDIC) constituting the gate driving circuit 120 starts operations. Also, the gate clock (GCLK) is a clock signal commonly input to one or more gate driving integrated circuits (GDIC) and controls the shift timing of the scan signal. Also, the gate output enable signal (GOE) designates timing information of one or more gate driving integrated circuits (GDIC).

Also, the timing controller 140 may output various data control signals including, for example, a source start pulse (SSP), a source sampling clock (SCLK), and a source output enable signal (SOE), to control the data driving circuit 130. Here, the source start pulse (SSP) controls the timing at which one or more source driving integrated circuits (SDIC) constituting the data driving circuit 130 starts data sampling. The source sampling clock (SCLK) is a clock signal that controls the timing of sampling data in the source driving integrated circuit(s) (SDIC). The source output enable signal (SOE) controls the output timing of the data driving circuit 130.

The display apparatus 100 may further include a power management integrated circuit that supplies various voltages or currents to the display panel 110, the gate driving circuit 120, the data driving circuit 130, etc., or controls the various voltages or currents to be supplied.

In another aspect, a light emitting device may be disposed in each subpixel (SP). For example, an organic light emitting display apparatus may include a light emitting device, such as a light emitting diode, in each subpixel (SP) and may display an image by controlling the current flowing through the light emitting device according to the data voltage.

Figure 2:
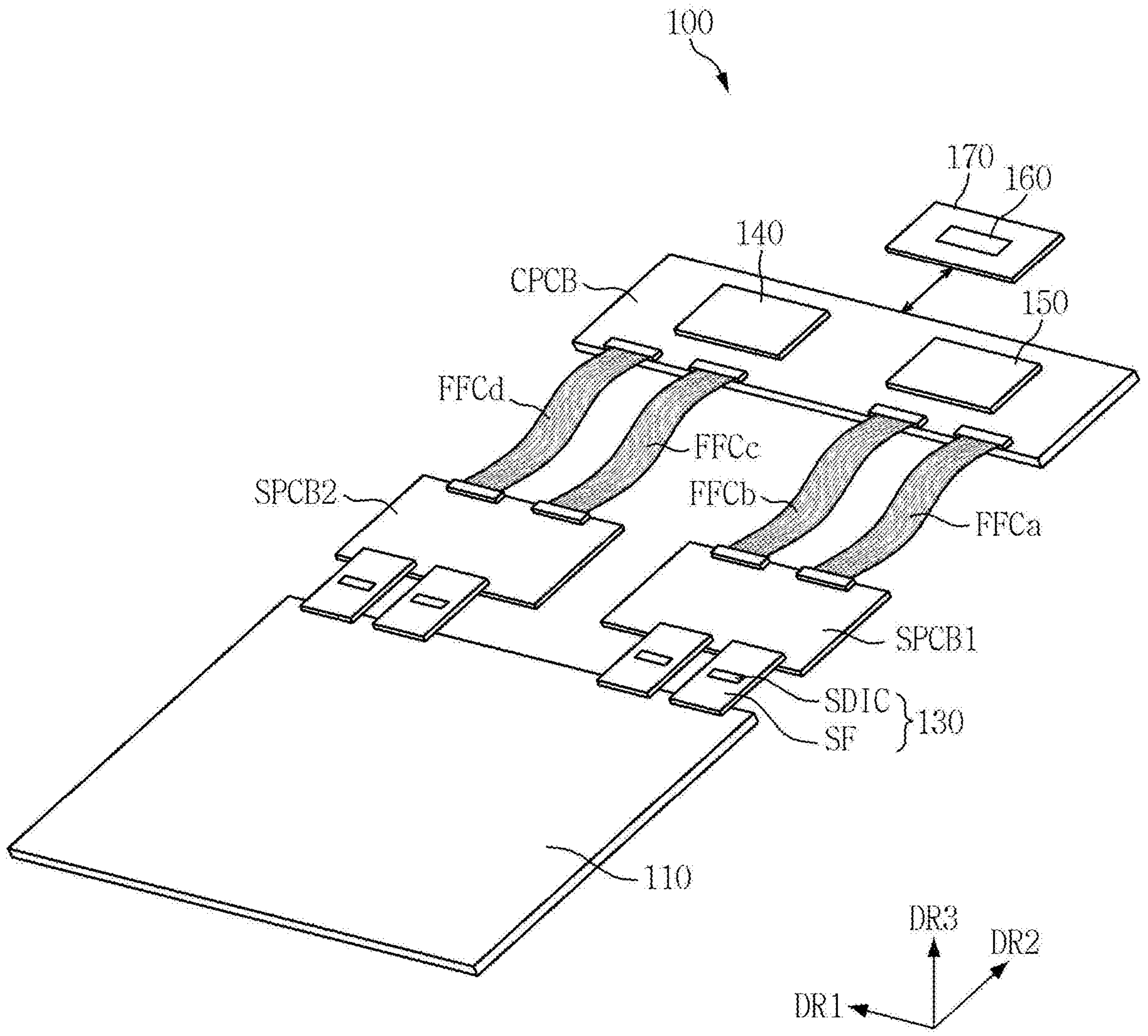
FIG. 2 is a view showing an example of the display apparatus according to the first embodiment.

FIG. 2 is a view showing an example of the display apparatus according to the first embodiment.

As illustrated in FIG. 2, in the display apparatus 100 according to the first example embodiment, the source driving integrated circuits (SDIC) included in the data driving circuit 130 may be implemented by a Chip-On-Film (COF) method, among various methods (e.g., TAB, COG, COF, etc.), and the gate driving circuit 120 may be implemented in the form of a Gate-In-Panel (GIP), among various methods (e.g., TAB, COG, COF, GIP, etc.).

Where the gate driving circuit 120 is implemented in the form of a GIP, a plurality of gate driving integrated circuits (GDIC) included in the gate driving circuit 120 may be formed directly in the bezel area of the display panel 110. Here, the gate driving integrated circuits (GDIC) may be supplied with various signals (e.g., clock signal, gate high signal, gate low signal, etc.) to generate the scan signal SCAN, through a gate driving related signal wiring arranged in the bezel area.

Likewise, one or more source driving integrated circuits (SDIC) included in the data driving circuit 130 may each be mounted on a source film (SF), and one side of the source film (SF) may be electrically connected to the display panel 110. Also, wirings for electrically connecting the source driving integrated circuit(s) (SDIC) and the display panel 110 may be disposed on the source film(s) (SF).

The display apparatus 100 may include at least one source printed circuit board (SPCB) and a control printed circuit board (CPCB) for mounting control components and various electrical equipment, for the purpose of circuit connection between the plurality of source driving integrated circuits (SDIC) and other devices.

Here, the other side of the source film (SF) on which the source driving integrated circuit (SDIC) is mounted may be connected to at least one source printed circuit board (SPCB). That is, one side of the source film (SF) on which the source driving integrated circuit (SDIC) is mounted may be electrically connected to the display panel 110, and the other side may be electrically connected to the source printed circuit board (SPCB). For example, a plurality of source films (SF) may be connected to one source printed circuit board (SPCB). However, embodiments of the present disclosure are not limited thereto.

The timing controller 140 and the power management integrated circuit (PMIC) 150 may be mounted on the control printed circuit board (CPCB). The timing controller 140 may control the operations of the data driving circuit 130 and the gate driving circuit 120. The power management integrated circuit 150 may supply driving voltage or current to the display panel 110, the data driving circuit 130, and the gate driving circuit 120, and may control the supplied voltage or current.

At least one source printed circuit board (SPCB) and at least one control printed circuit board (CPCB) may be circuit-connected through at least one connecting member. For example, the connecting member may be composed of a flexible printed circuit (FPC), a flexible flat cable (FFC), etc. For example, there may be a plurality of source printed circuit boards (SPCB), and the plurality of source printed circuit boards (SPCB) may be connected to one control printed circuit board (CPCB). In this case, one source printed circuit board (SPCB) may be connected to the control printed circuit board (CPCB) through a plurality of flexible flat cables (FFC). FIG. 2 shows an example including two source printed circuit boards (SPCB), four flexible flat cables (FFC), and one control printed circuit board (CPCB), but the present disclosure is not limited thereto.

The display apparatus 100 may further include a set board 170 electrically connected to the control printed circuit board (CPCB). Here, the set board 170 may also be referred to as a power board. The set board 170 may include a main power management circuit (M-PMC) 160 that manages the overall power for the display apparatus 100. The main power management circuit 160 may be interconnected with the power management integrated circuit 150.

In the example case of the display apparatus 100 configured as above, the driving voltage may be generated in the set board 170 and be transmitted to the power management integrated circuit 150 within the control printed circuit board (CPCB). The power management integrated circuit 150 may transmit the driving voltage for display driving or characteristic value sensing to the source printed circuit board(s) (SPCB) through the flexible printed circuit(s) (FPC) or the flexible flat cable(s) (FFC). The driving voltage transmitted to the source printed circuit board(s) (SPCB) may be supplied through the source driving integrated circuit (SDIC) to emit light from or sense a specific subpixel (SP) within the display panel 110.

Here, each subpixel (SP) arranged on the display panel 110 within the display apparatus 100 may be composed of a light emitting device and a circuit element, such as a driving transistor, for driving the light emitting device.

The type and the number of the circuit elements constituting each subpixel (SP) may be determined in various ways depending on provided functions and design methods.

Figure 3:
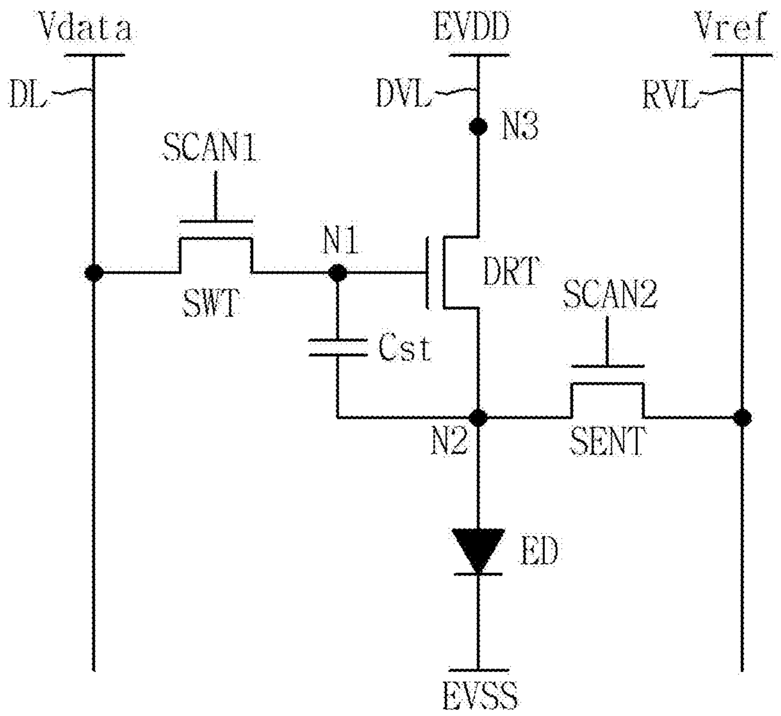
FIG. 3 is a view showing an example of a circuit constituting subpixels in the display apparatus according to the first embodiment.

FIG. 3 is a view showing an example of a circuit constituting the subpixels in the display apparatus according to the first embodiment.

As shown in FIG. 3, in the display apparatus 100 according to the first example embodiment, the subpixel (SP) may include one or more transistors and a capacitor, and an organic light emitting diode may be disposed as a light emitting device ED in the subpixel.

For example, the subpixel (SP) may include a driving transistor DRT, a switching transistor SWT, a sensing transistor SENT, a storage capacitor Cst, and a light emitting device ED.

The driving transistor DRT has a first node N1, a second node N2, and a third node N3. The first node N1 of the driving transistor DRT may be a gate node to which a data voltage Vdata is applied from the data driving circuit 130 through the data line (DL) when the switching transistor SWT is turned on. The second node N2 of the driving transistor DRT may be electrically connected to an anode electrode of the light emitting device ED and may be one of a source node and a drain node. The third node N3 of the driving transistor DRT may be electrically connected to a driving voltage line DVL, to which a driving voltage EVDD is applied, and may be the other of the drain node and the source node.

Here, during a period when the display is driven, the driving voltage EVDD to display the image may be supplied through a driving voltage line DVL. For example, the driving voltage EVDD to display the image may be 27 V.

The switching transistor SWT may be electrically connected between the first node N1 of the driving transistor DRT and the data line (DL) and may operate according to the scan signal (SCAN or SCAN1) supplied through the gate line (GL) connected to the gate node of the switching transistor. Also, when the switching transistor SWT is turned on, the switching transistor SWT transmits the data voltage Vdata supplied through the data line (DL) to the gate node of the driving transistor DRT, so that the operation of the driving transistor DRT is controlled.

The sensing transistor SENT may be electrically connected between the second node N2 of the driving transistor DRT and a reference voltage line RVL. A gate line (GL) may be connected to the gate node of the sensing transistor SENT, which may operate according to a sense signal (SENSE or SCAN2) supplied through the gate line (GL). When the sensing transistor SENT is turned on, a sensing reference voltage Vref supplied through the reference voltage line RVL is transmitted to the second node N2 of the driving transistor DRT.

That is, by controlling the switching transistor SWT and the sensing transistor SENT, the voltage of the first node N1 and the voltage of the second node N2 of the driving transistor DRT may be controlled to supply or control the current for driving the light emitting device ED.

The gate nodes of the switching transistor SWT and the sensing transistor SENT may be connected together to one gate line (GL) or may be connected to different gate lines (GL). Here, a structure in which the switching transistor SWT and the sensing transistor SENT are connected respectively to different gate lines (GL) is shown as an example. In this case, the switching transistor SWT and the sensing transistor SENT can be controlled independently by the scan signal (SCAN or SCAN1) and the sense signal (SENSE or SCAN2) which are transmitted respectively through different gate lines (GL).

On the other hand, when the switching transistor SWT and the sensing transistor SENT are connected to the same gate line (GL), the switching transistor SWT and the sensing transistor SENT can be controlled simultaneously by the same scan or sense signal SCAN or SENSE (or SCAN1 or SCAN2) that is transmitted through a single gate line (GL), and an aperture ratio of the subpixel (SP) can be increased.

In another aspect, the transistor(s) disposed in the subpixel (SP) may be composed of not only an n-type transistor but also a p-type transistor. Herein, the case where the transistors are composed of n-type transistors is shown as an example.

The storage capacitor Cst may be electrically connected between the first node N1 and the second node N2 of the driving transistor DRT and may maintain the data voltage Vdata for one frame.

The storage capacitor Cst may alternatively be connected between the first node N1 and the third node N3 of the driving transistor DRT depending on the type of the driving transistor (DRT). In the example shown in FIG. 3, the anode electrode of the light emitting device ED may be electrically connected to the second node N2 of the driving transistor DRT, and a base voltage EVSS may be applied to a cathode electrode of the light emitting device ED.

Here, the base voltage EVSS may be a ground voltage or may be higher or lower than the ground voltage. Also, the base voltage EVSS may vary depending on the driving state. For example, the base voltage EVSS during display driving and the base voltage EVSS during sensing driving may be set differently.

The structure of the subpixel (SP) described above as an example is a 3T (Transistor) 1C (Capacitor) structure, which is only an example for illustrative purposes. The structure of the subpixel (SP) may further include one or more additional transistors or, in some cases, one or more additional capacitors. Alternatively, the plurality of subpixels (SP) may have the same structure, or some of the plurality of subpixels (SP) may have different structures from one another.

The display apparatus 100 according to the first example embodiment may use a method for measuring the current flowing based on a voltage charged in the storage capacitor Cst in a characteristic value sensing range of the driving transistor DRT to effectively sense the characteristic value of the driving transistor DRT, for example, threshold voltage or mobility. This is referred to as current sensing.

In other words, by measuring the current flowing based on the voltage charged in the storage capacitor Cst in the characteristic value sensing range of the driving transistor DRT, the characteristic value or change in the characteristic value of the driving transistor DRT within the subpixel (SP) can be determined.

Here, the reference voltage line RVL not only may serve to transmit the reference voltage Vref but also may serve as a sensing line for sensing the characteristic value of the driving transistor DRT within the subpixel (SP). Therefore, the reference voltage line RVL can be referred to as a sensing line.

Figure 4:
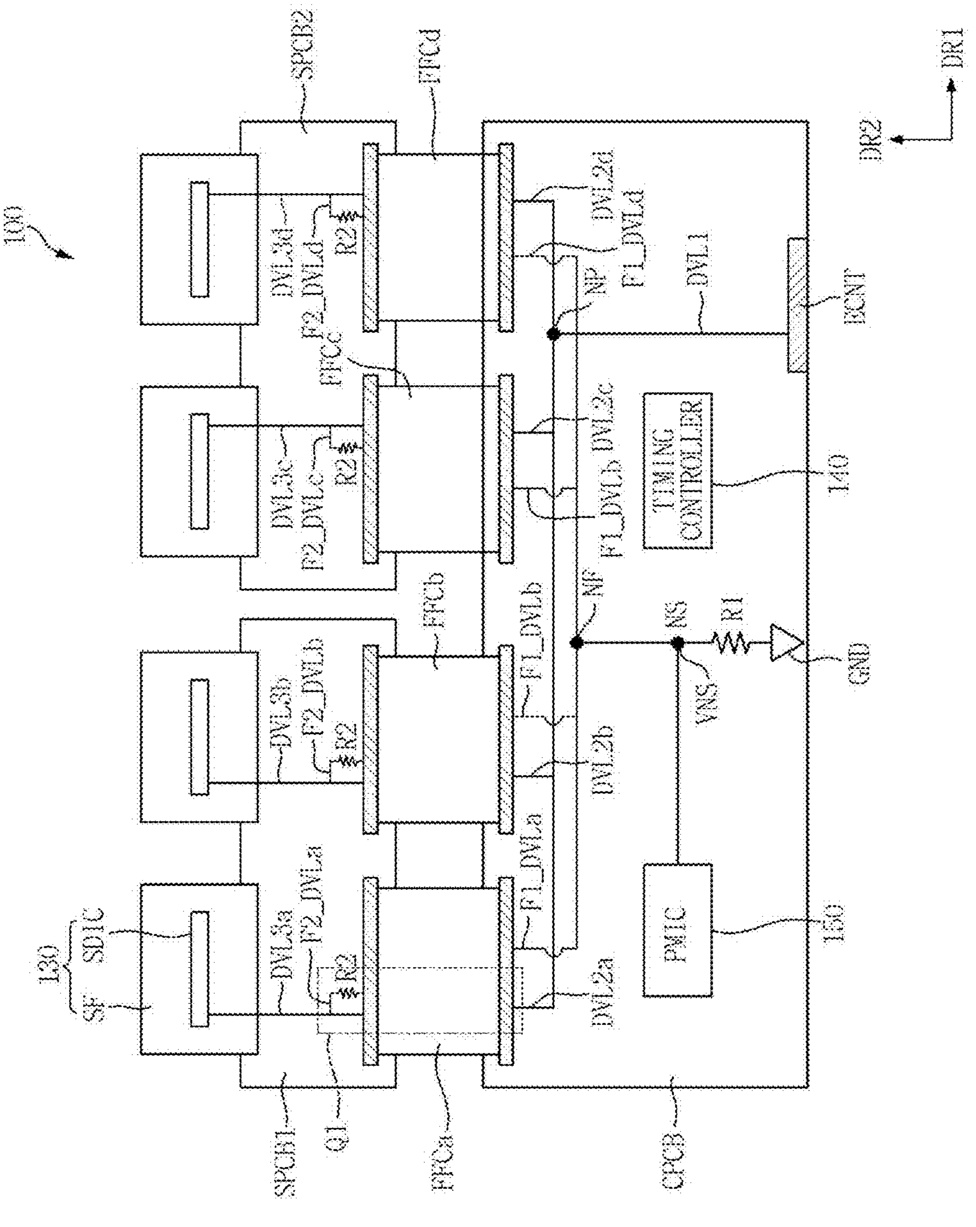
FIG. 4 is a plan layout view of the display apparatus according to FIG. 2.

FIG. 4 is a plan layout view of the display apparatus according to FIG. 2.

As illustrated in FIG. 4, a voltage contact part ECNT may be formed in the control printed circuit board (CPCB). The voltage contact part ECNT may be electrically connected to the set board 170 described above and shown in FIG. 2. The voltage contact part ECNT may be connected to the main power management circuit 160 on the set board 170, and a driving voltage (EVDD in FIG. 3) may be applied from the main power management circuit 160 to the voltage contact part ECNT. The voltage contact part ECNT may be connected to the driving voltage line DVL.

As shown in FIG. 4, the driving voltage line (see DVL in FIG. 3) may extend from the voltage contact part ECNT to the display panel (see 110 in FIG. 2). The driving voltage line (see DVL in FIG. 3) may include a first driving voltage line DVL1, second driving voltage lines DVL2*a*, DVL2*b*, DVL2*c*, and DVL2*d*, and third driving voltage lines DVL3*a*, DVL3*b*, DVL3*c*, and DVL3*d*.

The first driving voltage line DVL1 on the control printed circuit board (CPCB) may be connected to the voltage contact part ECNT.

On the control printed circuit board (CPCB), the first driving voltage line DVL1 may extend in one direction (e.g., a second direction DR2) and may then branch out in another direction (e.g., a first direction DR1). The second driving voltage lines DVL2*a*, DVL2*b*, DVL2*c*, and DVL2*d* branched from the first driving voltage line DVL1 may each extend in the one direction (e.g., the second direction DR2). The branched second driving voltage lines DVL2*a*, DVL2*b*, DVL2*c*, and DVL2*d* may be electrically connected to the corresponding flexible flat cables FFCa, FFCb, FFCc, and FFCd, respectively.

A plurality of flexible flat cables FFCa, FFCb, FFCc, and FFCd may be provided. For example, four flexible flat cables may be provided as illustrated here. However, the number of flexible flat cables is not limited thereto. One end of each of the plurality of flexible flat cables FFCa, FFCb, FFCc, and FFCd may be electrically connected to the corresponding one of the second driving voltage lines DVL2*a*, DVL2*b*, DVL2*c*, and DVL2*d*.

The flexible flat cables FFCa and FFCb may be connected to a first source printed circuit board (SPCB1) on the other side in a first direction DR1, and the flexible flat cables FFCc and FFCd may be connected to a second source printed circuit board (SPCB2) on one side in the second direction DR2.

Other end of the plurality of flexible flat cables FFCa, FFCb, FFCc, and FFCd may be electrically connected to the corresponding third driving voltage lines DVL3*a*, DVL3*b*, DVL3*c*, and DVL3*d*, respectively. The third driving voltage lines DVL3*a*, DVL3*b*, DVL3*c*, and DVL3*d* may be disposed respectively on the source printed circuit boards (SPCB) and may each extend in the one direction (e.g., the second direction DR2).

One ends of the source printed circuit boards (SPCB1 and SPCB2) may be connected respectively to the flexible flat cables FFCa, FFCb, FFCc, and FFCd, and the other ends of the source printed circuit boards (SPCB1 and SPCB2) may be connected to the data driving circuit 130.

The third driving voltage lines DVL3*a*, DVL3*b*, DVL3*c*, and DVL3*d* may extend to the data driving circuit 130 and may be electrically connected to the corresponding source driving integrated circuits (SDIC), respectively.

The display apparatus 100 may further include a feedback driving voltage line. The feedback driving voltage line may include second feedback driving voltage lines F2_DVLa, F2_DVLb, F2_DVLc, and F2_DVLd branched from the third driving voltage lines DVL3*a*, DVL3*b*, DVL3*c*, and DVL3*d*, respectively, and first feedback driving voltage lines F1_DVLa, F1_DVLb, F1_DVLc, and F1_DVLd electrically connected to the power management integrated circuit 150.

The second feedback driving voltage lines F2_DVLa, F2_DVLb, F2_DVLc, and F2_DVLd may be branched from the third driving voltage lines DVL3*a*, DVL3*b*, DVL3*c*, and DVL3*d*, respectively, and may be electrically connected to the corresponding flexible flat cables FFCa, FFCb, FFCc, and FFCd, respectively. A pull-up resistor R2 may be formed in each of the second feedback driving voltage lines F2_DVLa, F2_DVLb, F2_DVLc, and F2_DVLd.

The first feedback driving voltage lines F1_DVLa, F1_DVLb, F1_DVLc, and F1_DVLd may be electrically connected to the corresponding flexible flat cables FFCa, FFCb, FFCc, and FFCd, respectively.

The first feedback driving voltage lines F1_DVLa, F1_DVLb, F1_DVLc, and F1_DVLd may be joined together at a feedback node NF. The feedback node NF may be connected to a sensing node NS. A pull-down resistor R1 may be formed between the ground GND and the sensing node NS. The sensing node NS may be electrically connected to the power management integrated circuit (PMIC).

The first feedback driving voltage lines F1_DVLa, F1_DVLb, F1_DVLc, and F1_DVLd may intersect the second driving voltage lines DVL2*a*, DVL2*b*, DVL2*c*, and DVL2*d*, respectively. However, they may be located in different layers, so that a short-circuit may be prevented.

Figure 5:
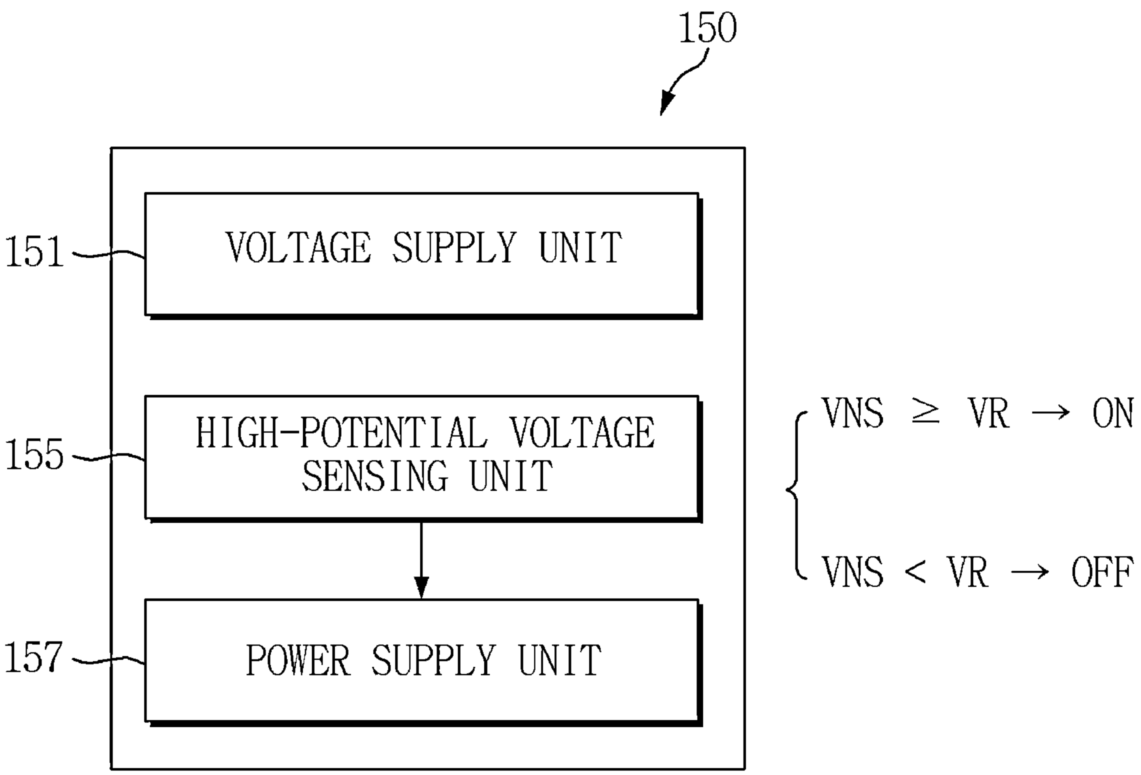
FIG. 5 is a view showing components of a power management integrated circuit according to FIG. 4.

FIG. 5 is a view showing components of the power management integrated circuit according to FIG. 4.

As shown in FIGS. 4 and 5, the power management integrated circuit 150 may include a voltage supply unit (or circuit) 151, a driving voltage sensing unit (or circuit) 155, and a power supply unit (or circuit) 157. The power supply unit 157 may be connected to the main power management circuit 160 of the set board 170. The main power management circuit 160 may supply power capable of turning on the power management integrated circuit 150 to the power supply unit 157. When the power supply unit 157 is turned on, the voltage supply unit 151 and the driving voltage sensing unit 155 is able to operate. The voltage supply unit 151 may transmit the driving voltage for display driving or characteristic value sensing to the source printed circuit board(s) (SPCB) through the flexible printed circuit(s) (FPC) or the flexible flat cable(s) (FFC). The driving voltage sensing unit 155 may sense a sensing voltage VNS applied to the sensing node NS. The high-potential voltage sensing unit 155 may control the turning on/off of the power unit 157 by comparing the sensed sensing voltage VNS with a previously stored reference voltage VR. This will be described in more detail later.

Figure 6:
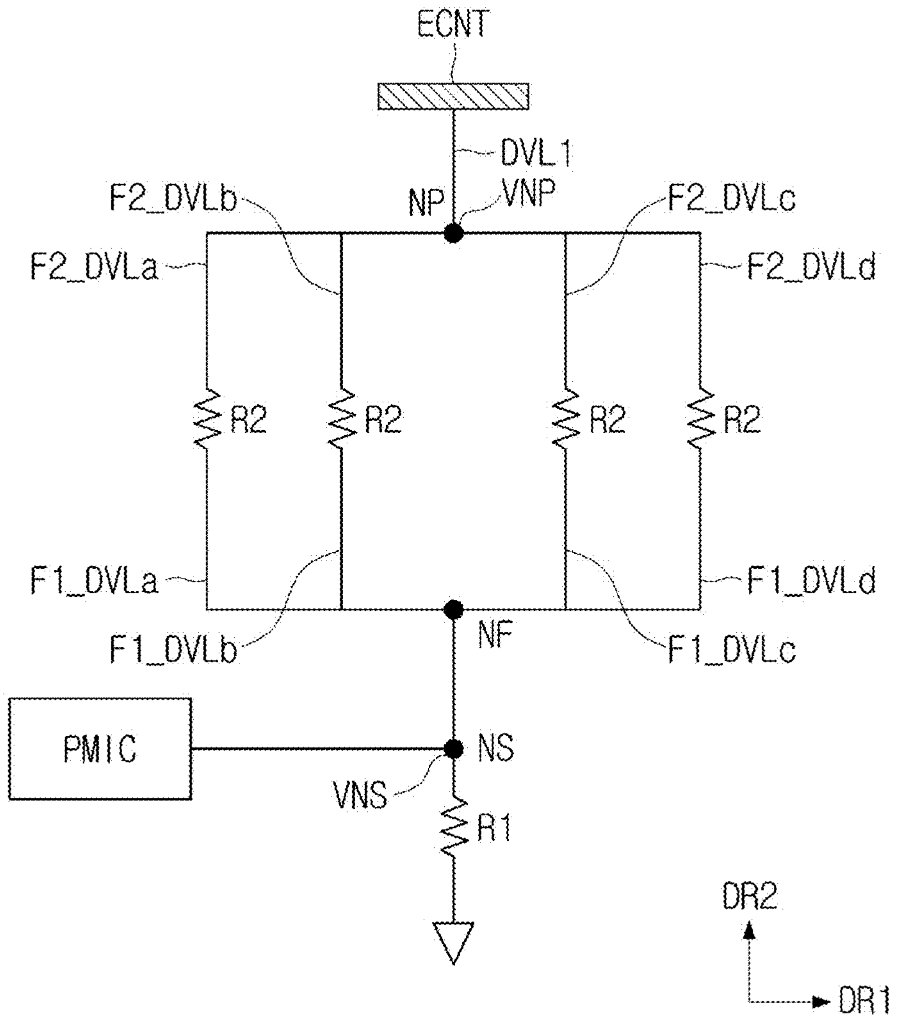
FIG. 6 is a circuit diagram of a driving voltage line and a feedback driving voltage line of the display apparatus according to the first example embodiment.

FIG. 6 is a circuit diagram of the driving voltage line and the feedback driving voltage line of the display apparatus according to the first example embodiment.

As shown in FIG. 6, the driving voltage EVDD (EVDD in FIG. 3) may be applied from the voltage contact part ECNT to an ingress node NP. The ingress node NP may be connected to each of the second feedback driving voltage lines F2_DVLa, F2_DVLb, F2_DVLc, and F2_DVLd. A pull-up resistor R2 (or R2_1) may be formed between each of the second feedback driving voltage lines F2_DVLa, F2_DVLb, F2_DVLc, and F2_DVLd and the corresponding one of the first feedback driving voltage lines F1_DVLa, F1_DVLb, F1_DVLc, and F1_DVLd. Although the pull-up resistor R2 may be formed on the second feedback driving voltage lines F2_DVLa, F2_DVLb, F2_DVLc, and F2_DVLd, the pull-up resistor R2 is illustrated as shown in FIG. 6 for convenience of description.

The first feedback driving voltage lines F1_DVLa, F1_DVLb, F1_DVLc, and F1_DVLd may be joined at the feedback node NF. The feedback node NF may be connected to the sensing node NS. As shown in FIG. 6, the pull-up resistors R2 on the second feedback driving voltage lines F2_DVLa, F2_DVLb, F2_DVLc, and F2_DVLd may be connected in parallel.

The sensing voltage VNS may be determined based on a ratio of a composite resistance of the pull-up resistors R2 (or R2_1) connected parallel between the ingress node NP and the feedback node NF and a resistance of the pull-down resistor R1.

Figure 7:
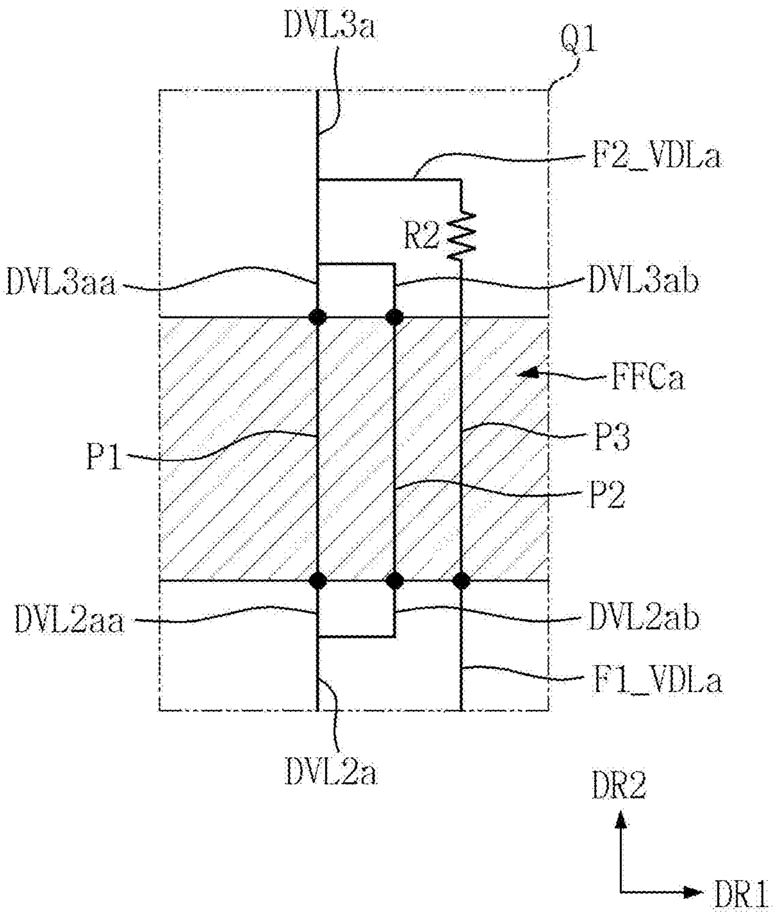
FIG. 7 is an enlarged plan view of region "Q1" of FIG. 4.

FIG. 7 is an enlarged plan view of region “Q1” of FIG. 4.

FIG. 7 shows the second driving voltage line DVL2*a*, the third driving voltage line DVL3*a*, and the first and second feedback driving voltage lines F1_DVLa and F2_DVLb respectively connected to the flexible flat cable FFCa positioned at opposite sides in the second direction DR2 (see also FIG. 4). The structure and connection structure of the flexible flat cable FFCa, with the second and third driving voltage lines DVL2*a* and DVL3*a* and the first and second feedback driving voltage lines F1_DVLa and F2_DVLb respectively at opposite sides in the second direction DR2, as illustrated in FIG. 7, can be applied in the same manner to the structure and connection structure of the other three flexible flat cables FFCb, FFCc, and FFCd, the corresponding second driving voltage lines DVL2*b*, DVL2*c*, and DVL2*d*, the corresponding third driving voltage lines DVL3*b*, DVL3*c*, and DVL3*d*, and the corresponding feedback driving voltage lines.

As shown in FIG. 7, the second driving voltage line DVL2*a* may be branched into a second-first driving voltage line DVL2*aa* and a second-second driving voltage line DVL2*ab*. The second-first driving voltage line DVL2*aa* and the second-second driving voltage line DVL2*ab* may be electrically connected to a first drive pin P1 and a second drive pin P2 of the flexible flat cable FFCa, respectively.

Also, the third driving voltage line DVL3*a* may be branched into a third-first driving voltage line DVL3*aa* and a third-second driving voltage line DVL3*ab*. The third-first driving voltage line DVL3*aa* and the third-second driving voltage line DVL3*ab* may be electrically connected to the first drive pin P1 and the second drive pin P2, respectively.

The second feedback driving voltage line F2_DVLa and the first feedback driving voltage line F1_DVLa may be electrically connected through the flexible flat cable FFCa. The second feedback driving voltage line F2_DVLa and the first feedback driving voltage line F1_DVLa may be electrically connected through a dummy pin P3. Hereinafter, since the second feedback driving voltage line F2_DVLa and the first feedback driving voltage line F1_DVLa may be electrically connected through the dummy pin P3, the dummy pin P3 is referred to as "feedback pin P3."

In the display apparatus 100 according to the first example embodiment, the second feedback driving voltage line F2_DVLa and the first feedback driving voltage line F1_DVLa may be connected respectively to the feedback pin P3 disposed as a spare on the flexible flat cable FFCa. Thus, it may not be necessary to form, in the flexible flat cable FFCa, a separate pin for connecting the second feedback driving voltage line F2_DVLa and the first feedback driving voltage line F1_DVLa.

Figure 8:
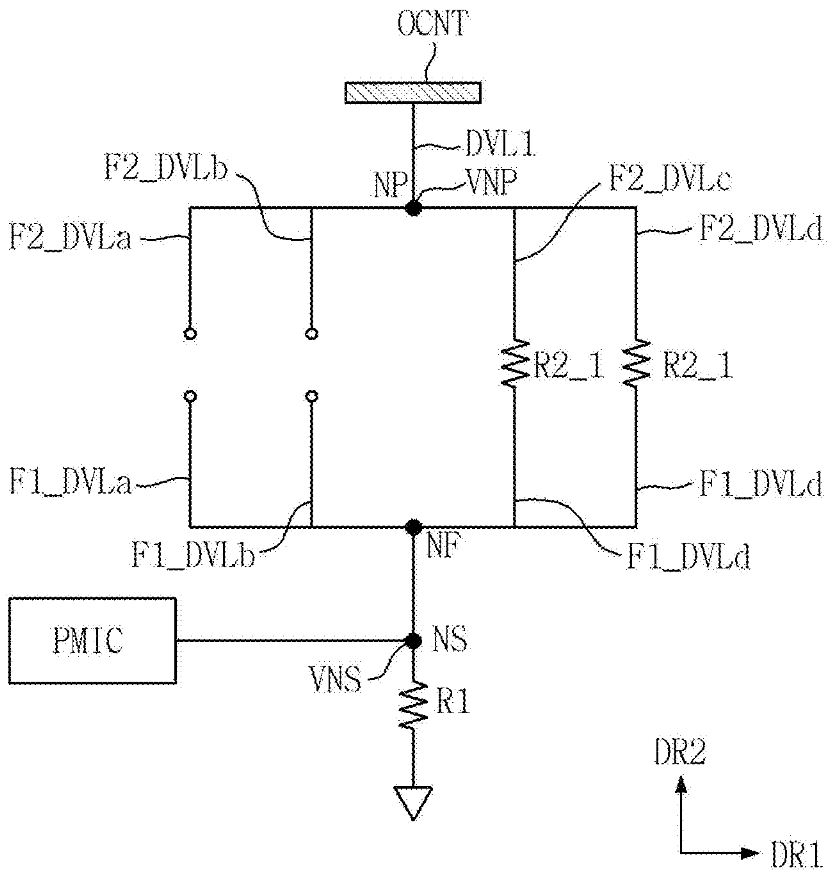
FIG. 8 is a circuit diagram showing that at least one of a plurality of flexible flat cables of the display apparatus according to the first example embodiment is loosely connected.

As shown in FIGS. 4 and 8, as an example, connection failure of the flexible flat cables FFCa and FFCb may occur. For example, the connection failure may occur between the second driving voltage lines DVL2*a* and DVL2*b* and the flexible flat cables FFCa and FFCb, between the third driving voltage lines DVL3*a* and DVL3*b* and the flexible flat cables FFCa and FFCb, between the second feedback driving voltage lines F2_DVLa and F2_DVLb and the flexible flat cables FFCa and FFCb, and/or between the first feedback driving voltage lines F1_DVLa and F1_DVLb and the flexible flat cables FFCa and FFCb. FIG. 8 illustrates an example connection failure in the schematic circuit diagram of FIG. 6. Therefore, for example, the connection failure may occur in the FIG. 6 example circuit between the second feedback driving voltage lines F2_DVLa and F2_DVLb and the flexible flat cables FFCa and FFCb and between the first feedback driving voltage lines F1_DVLa and F1_DVLb and the flexible flat cables FFCa and FFCb, so that the first feedback driving voltage lines F1_DVLa and F1_DVLb are disconnected from each other and the second feedback driving voltage lines F2_DVLa and F2_DVLb are disconnected from each other.

As shown in FIG. 8, when the connection failure (e.g., loose connection) of the flexible flat cables FFCa and FFCb occurs, the sensing voltage VNS may be determined based on a ratio of a composite resistance of the pull-up resistors R2_1 connected in parallel between the ingress node NP and the feedback node NF and a resistance of the pull-down resistor R1. Therefore, the sensing voltage VNS here may be lower in comparison with the sensing voltage VNS in a case without a connection failure (loose connection) of the flexible flat cables FFCa and FFCb.

Figure 9:
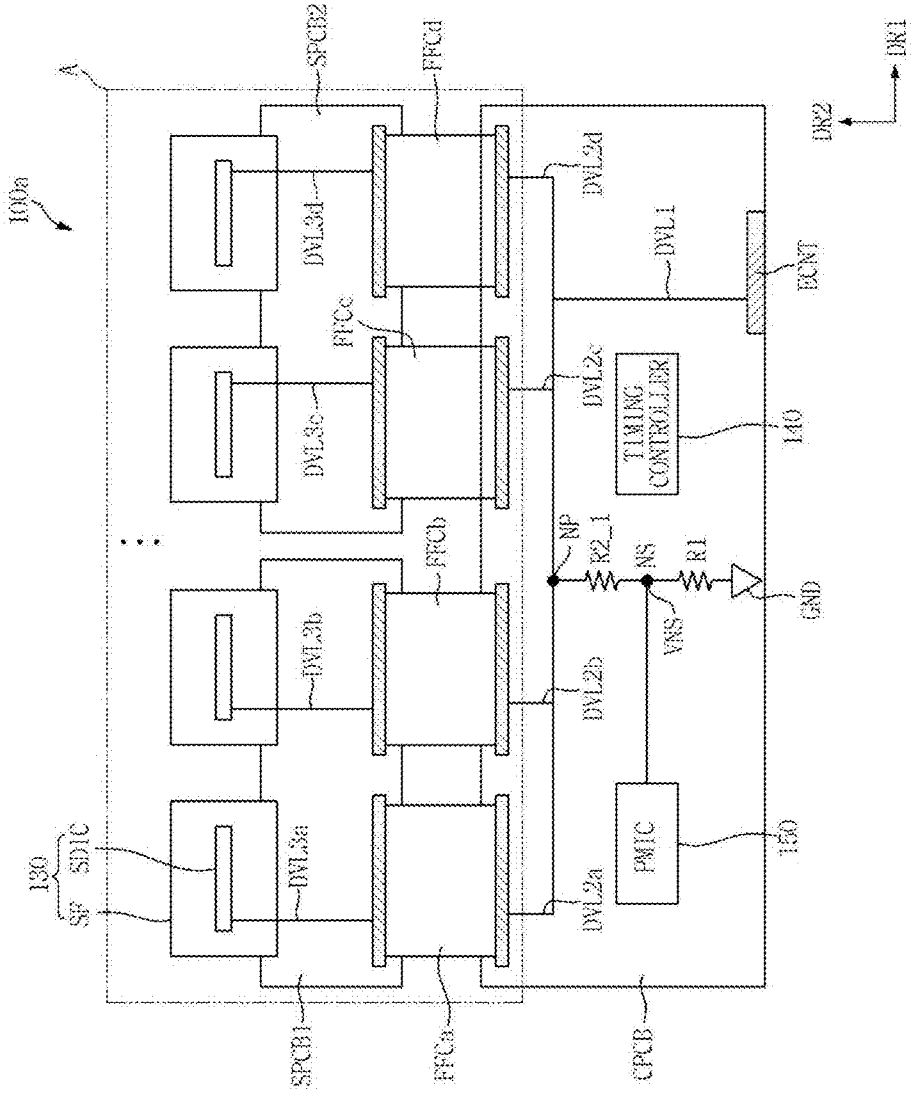
FIG. 9 is a plan layout view of the display apparatus according to a comparative example.
Figure 10:
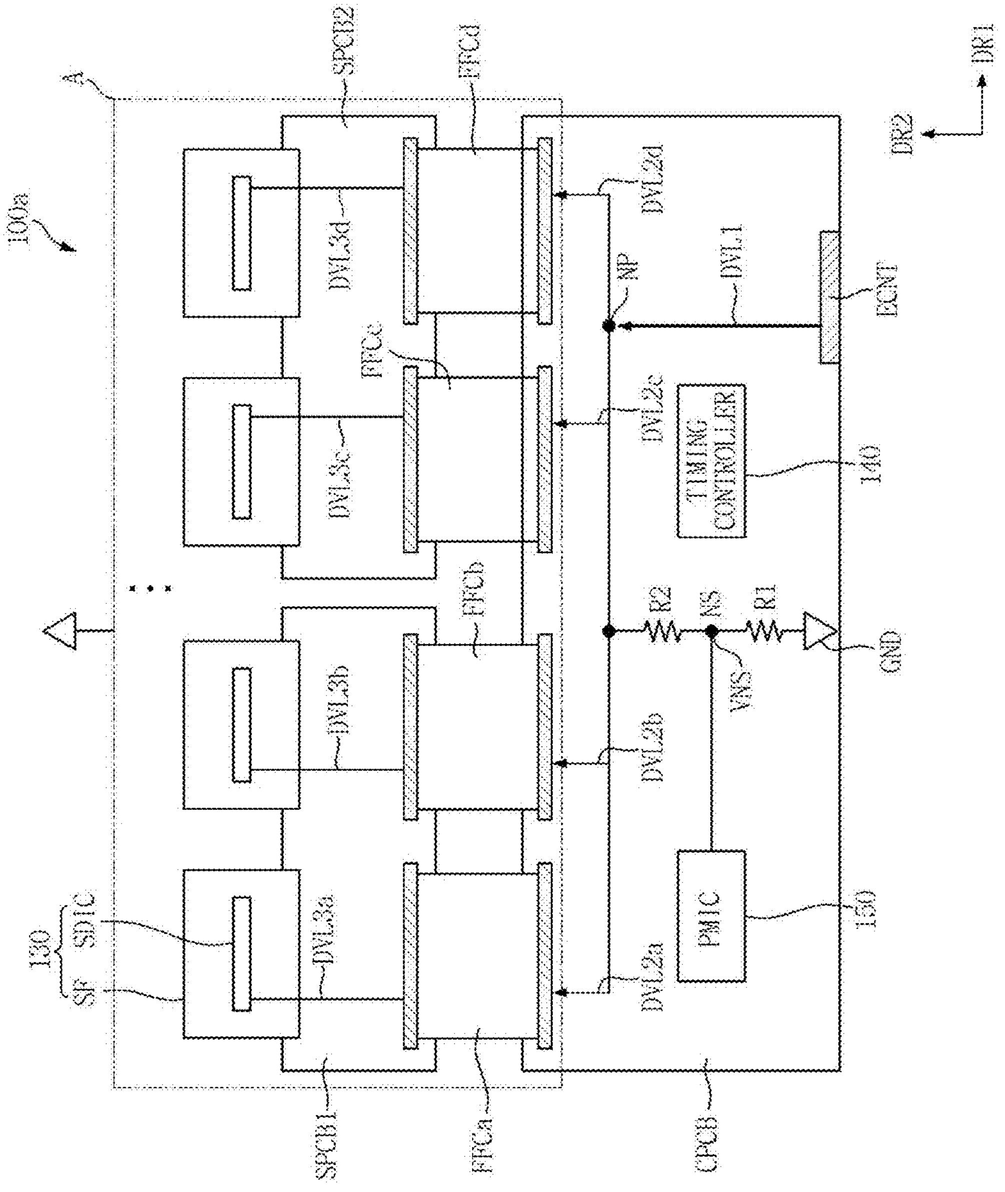
FIG. 10 is a mimetic diagram showing that a current flows through the driving voltage line from a voltage contact part of the display apparatus according to the comparative example.
Figure 11:
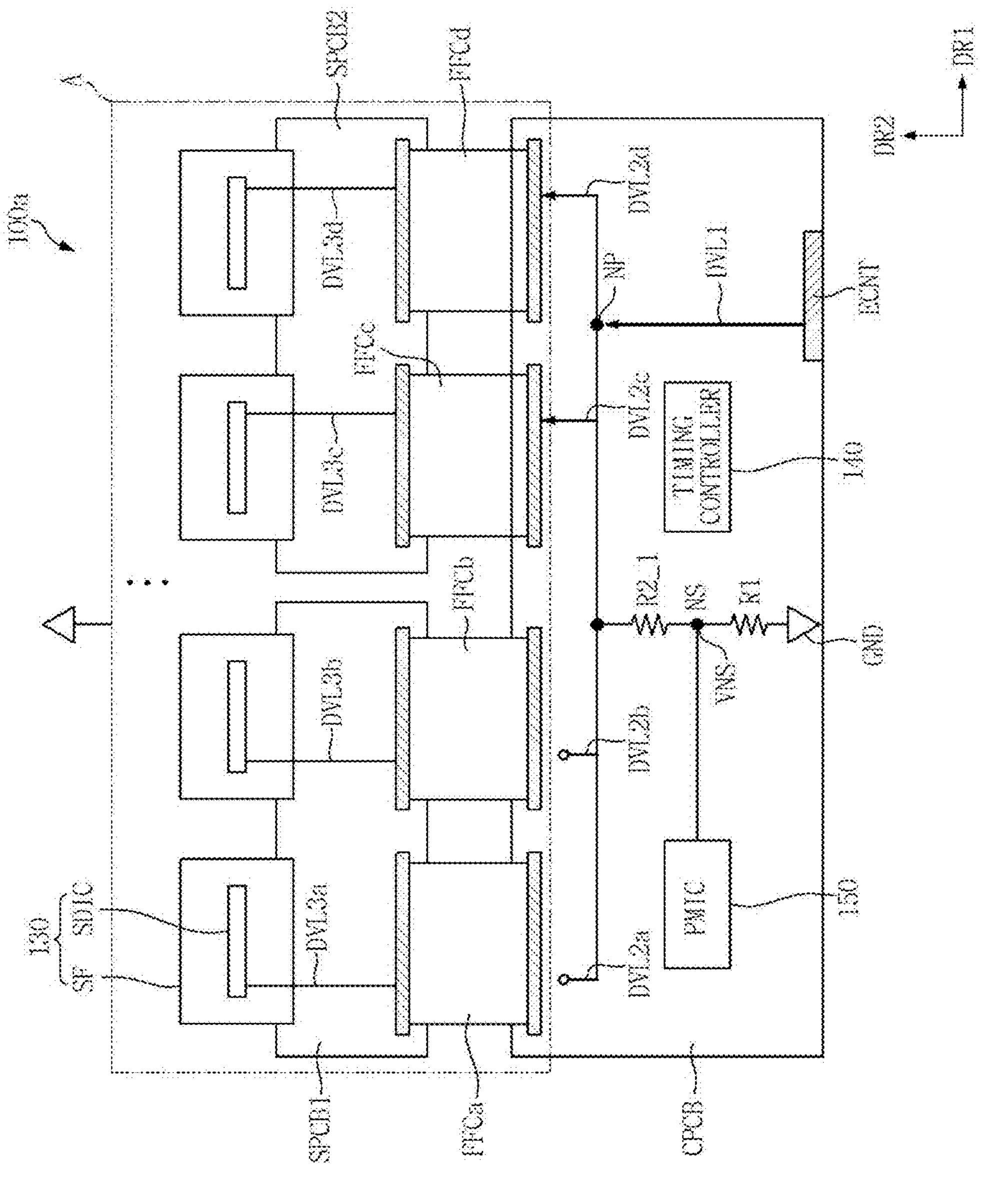
FIG. 11 is a mimetic diagram showing, when at least one of the plurality of flexible flat cables of the display apparatus according to the comparative example is loosely connected, a current flows through another flexible flat cable.

FIG. 9 is a plan layout view of the display apparatus according to a comparative example. FIG. 10 is a mimetic diagram showing that a current flows through the driving voltage lines DVL1 and DVL2*a* to DVL2*d* from the voltage contact part ECNT of the display apparatus 100*a* according to the comparative example. FIG. 11 is a mimetic diagram showing that, when at least one of the plurality of flexible flat cables FFCa to FFCd of the display apparatus 100*a* according to the comparative example is loosely connected, a current flows through other flexible flat cables.

Hereinafter, for convenience of description, a structure including the flexible flat cables FFCa, FFCb, FFCc, and FFCd, the source printed circuit boards (SPCB1 and SPCB2), the data driving circuit 130, and the display panel (see 110 in FIG. 2), as illustrated in FIGS. 9 to 11, is referred to as structure "A". In the display apparatus 100*a* according to the comparative example, the structure "A" may have a predetermined resistance, and the structure "A" may be grounded at a periphery of the display panel (see 110 in FIG. 2). If the structure "A" is viewed as a structure with a predetermined resistance, the second driving voltage lines DVL2*a*, DVL2*b*, DVL2*c*, and DVL2*d* may be considered to be arranged in a parallel structure.

As shown in FIG. 9, the ingress node NP may be connected to the first driving voltage line DVL1 and the second driving voltage lines DVL2*a*, DVL2*b*, DVL2*c*, and DVL2*d* branched from the first driving voltage line DVL1. The feedback driving voltage line may be branched from the ingress node NP. The pull-down resistor R1 between the ground GND and the sensing node NS and the pull-up resistor R2_1 between the sensing node NS and the ingress node NP may be formed on the feedback voltage line. The sensing node NS may be electrically connected to the power management integrated circuit (PMIC) 150.

The driving voltage sensing unit (see 155 in FIG. 5) may sense the sensing voltage VNS, thereby sensing the driving voltages of the second driving voltage lines DVL2*a*, DVL2*b*, DVL2*c*, and DVL2*d* connected respectively to the plurality of flexible flat cables FFCa, FFCb, FFCc, and FFCd (or the voltage of the ingress node NP). The sensing voltage VNS may be determined from the voltage of the ingress node NP based on a ratio between the resistance of the pull-down resistor R1 and the resistance of the pull-up resistor R2.

The driving voltage sensing unit (see 155 in FIG. 5) may sense the voltage applied to the ingress node NP and may sense whether the desired driving voltage is applied to each of the second driving voltage lines DVL2*a*, DVL2*b*, DVL2*c*, and DVL2*d*. However, unlike in the display apparatus according to the first example embodiment (see 100 in FIG. 4), it may be difficult for the driving voltage sensing unit (see 155 in FIG. 5) to sense whether the plurality of flexible flat cables FFCa, FFCb, FFCc, and FFCd are securely connected in the comparative example. This is because, regardless of whether the plurality of flexible flat cables FFCa, FFCb, FFCc, and FFCd are each securely connected or some of the plurality of flexible flat cables FFCa, FFCb, FFCc, and FFCd are loosely connected, the voltages applied to the ingress node NP would be the same in the comparative example.

The structure "A" including the flexible flat cables FFCa, FFCb, FFCc, and FFCd, the source printed circuit boards SPCB1 and SPCB2, the data driving circuit 130, and the display panel (see 110 in FIG. 2) may have a predetermined resistance, and an end of the structure "A" may be connected to the ground.

The driving voltage (EVDD in FIG. 3) may be applied from the voltage contact part ECNT, and a current line may be formed from the voltage contact part ECNT to the first driving voltage line DVL1, the second driving voltage lines DVL2*a*, DVL2*b*, DVL2*c*, and DVL2*d*, and the structure "A". The structure "A" may have a predetermined resistance, and a current flowing through the first driving voltage line DVL1 may be determined based on the predetermined resistance and the driving voltage (EVDD in FIG. 3) applied from the voltage contact part ECNT. If the connection between the second driving voltage lines DVL2*a*, DVL2*b*, DVL2*c*, and DVL2*d* and the corresponding flexible flat cables FFCa, FFCb, FFCc, and FFCd of the structure "A" is good, the current flowing through the first driving voltage line DVL1 may be distributed and applied to each of the second driving voltage lines DVL2*a*, DVL2*b*, DVL2*c*, and DVL2*d* (see FIG. 10). The current distributed and applied to each of the second driving voltage lines DVL2*a*, DVL2*b*, DVL2*c*, and DVL2*d* may be applied to the third driving voltage lines DVL3*a*, DVL3*b*, DVL3*c*, and DVL3*d* while flowing along the drive pins (see P1 and P2 in FIG. 7) of the corresponding flexible flat cables FFCa, FFCb, FFCc, and FFCd.

For example, as shown in FIG. 11, the connection failure may occur between the second driving voltage lines DVL2*a* and DVL2*b* and the corresponding flexible flat cables FFCa and FFCb of the structure "A". Then, the second driving voltage lines DVL2*a* and DVL2*b* and the corresponding flexible flat cables FFCa and FFCb of the structure "A" may not be electrically connected to each other. In this case as well, the structure "A" may have a predetermined resistance, and the current flowing through the first driving voltage line DVL1 may be determined based on the predetermined resistance and the driving voltage (EVDD in FIG. 3) applied from the voltage contact part ECNT.

Accordingly, the amount of current flowing through the first driving voltage line DVL1 of FIG. 11 would be the same as the amount of current flowing through the first driving voltage line DVL1 in FIG. 10. However, as shown in FIG. 11, when the connection failure occurs between the second driving voltage lines DVL2*a* and DVL2*b* and the corresponding flexible flat cables FFCa and FFCb of the structure "A", the current flowing through the first driving voltage line DVL1 may be distributed and flow only through the second driving voltage lines DVL2*c* and DVL2*d*. In this case, the current may be concentrated on the second driving voltage lines DVL2*a* and DVL2*b* and the corresponding flexible flat cables FFCc and FFCd of the structure "A", which may cause heat generation failure in the flexible flat cables FFCc and FFCd.

Also, in the case of the display apparatus 100*a* according to the comparative example, the driving voltage sensing unit (or high-potential voltage sensing unit) (see 155 in FIG. 5) may sense the voltage applied to the ingress node NP and may sense whether the desired driving voltage is applied to each of the second driving voltage lines DVL2*a*, DVL2*b*, DVL2*c*, and DVL2*d*. However, in the comparative example, it may be difficult for the driving voltage sensing unit to sense whether the plurality of flexible flat cables FFCa, FFCb, FFCc, and FFCd are securely connected. This is because, regardless of whether the plurality of flexible flat cables FFCa, FFCb, FFCc, and FFCd are well connected or some of the plurality of flexible flat cables FFCa, FFCb, FFCc, and FFCd are loosely connected, the voltages applied to the ingress node NP would be the same in the comparative example.

As illustrated in FIGS. 4 to 6, unlike in the display apparatus 100*a* according to the comparative example, in the case of the display apparatus 100 according to the first example embodiment of the present disclosure, the high-potential voltage sensing unit 155 may compare the sensed sensing voltage VNS and a previously stored reference voltage VR and may controls the turning on/off of the power supply unit 157. For example, the reference voltage VR may be the same as or lower by a predetermined magnitude than the sensing voltage VNS when a connection failure (loose connection) of the flexible flat cables FFCa, FFCb, FFCc, and FFCd does not occur.

For example, if the high-potential voltage sensing unit 155 determines that the sensed sensing voltage VNS is higher than the reference voltage VR, the high-potential voltage sensing unit 155 may turn on the power supply unit 157. If the high-potential voltage sensing unit 155 determines that the sensing voltage VNS is lower than the reference voltage VR, the high-potential voltage sensing unit 155 may turn off the power supply unit 157.

The voltage supply unit 151 may transmit the driving voltage for display driving or characteristic value sensing to the source printed circuit board(s) (SPCB) through the flexible printed circuit(s) (FPC) or the flexible flat cable(s) (FFC).

In other words, when a connection failure (loose connection) of the flexible flat cables FFCa, FFCb, FFCc, and FFCd occurs, the power supply unit 157 may be turned off. Accordingly, the supply of the driving voltage for display driving or characteristic value sensing from the voltage supply unit 151 may be stopped. As a result, no current flows through the flexible flat cables FFCa, FFCb, FFCc, and FFCd, so that potential heat generation defects in the flexible flat cables (FFCa, FFCb, FFCc, and FFCd) can be prevented in advance.

Figure 12:
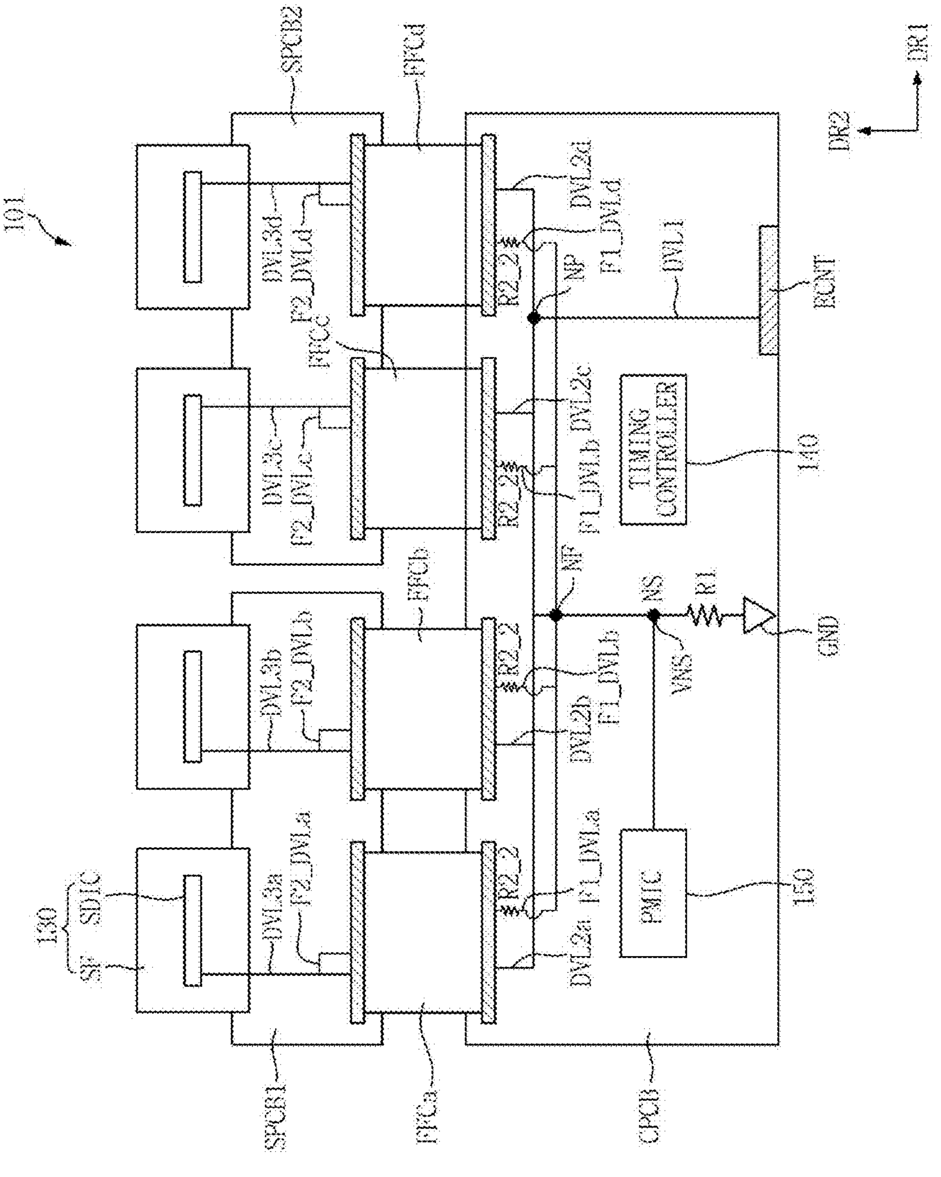
FIG. 12 is a plan layout view of a display apparatus according to a second example embodiment.

FIG. 12 is a plan layout view of a display apparatus according to a second example embodiment.

As shown in FIG. 12, a display apparatus 101 according to the second example embodiment is different from the display apparatus according to the FIG. 4 example in that a pull-up resistor R2_2 of the display apparatus 101 can be located in the first feedback driving voltage lines F1_DVLa, F1_DVLb, F1_DVLc, and F1_DVLd.

Since the other structures and connections are the same or similar to those illustrated or described above in connection with FIGS. 1 to 8, redundant descriptions thereof are omitted.

It will be apparent to those skilled in the art that the present disclosure is not limited by the above-described example embodiments and the accompanying drawings, and that various substitutions, modifications, and variations can be made in the present disclosure without departing from the spirit or scope of the disclosures. Therefore, the above example embodiments of the present disclosure are provided for illustrative purposes and are not intended to limit the scope or technical concept of the present disclosure. The protective scope of the present disclosure should be construed based on the following claims and their equivalents, and it is intended that the present disclosure cover all modifications and variations of this disclosure that come within the scope of the claims and their equivalents.

What is claimed is:

1. A display apparatus, comprising:

a display panel including a plurality of subpixels;

a control printed circuit board including a first driving voltage line, at least one second driving voltage line branched from the first driving voltage line, a power management circuit, and at least one first feedback driving voltage line electrically connected to the power management circuit;

a source printed circuit board electrically connected between the display panel and the control printed circuit board, the source printed circuit board including at least one third driving voltage line electrically connected to at least one of the subpixels; and at least one flexible flat cable connected between the source printed circuit board and the control printed circuit board, wherein a second driving voltage line, among the at least one second voltage line, is branched to a second-first driving voltage line and a second-second driving voltage line on the control printed circuit board, wherein a third driving voltage line, among the at least one third voltage line, is branched to a third-first driving voltage line and a third-second driving voltage line on the source printed circuit board, wherein the second-first driving voltage line is connected to the third-first driving voltage line through a flexible flat cable, among the at least one flexible flat cable, and the second-second driving voltage line is connected to the third-second driving voltage line through the flexible flat cable, and wherein the at least one first feedback driving voltage line is electrically connected to the at least one flexible flat cable.

2. The display apparatus of claim 1, wherein the power management circuit is configured to control a supply of a driving voltage to the at least one third driving voltage line via the first driving voltage line and the at least one second voltage line based on a voltage at a sensing node electrically connected to the at least one first feedback driving voltage line.

3. The display apparatus of claim 2, wherein the power management circuit includes:

a power supply circuit configured to receive power for turning on the power management circuit; and a high-potential voltage sensing circuit configured to sense the voltage at the sensing node and to turn the power supply circuit on or off based on the sensed voltage at the sensing node.

4. The display apparatus of claim 3, wherein the high-potential voltage sensing circuit is further configured to:

maintain the power supply circuit on if the sensed voltage at the sensing node is greater than or equal to a predetermined reference voltage; and turn the power supply off if the sensed voltage at the sensing node is less than the predetermined reference voltage.

5. The display apparatus of claim 3, wherein:

the power management circuit further includes a voltage supply circuit configured to provide the driving voltage to the at least one third driving voltage line via the first driving voltage line, the at least second driving voltage line, and the at least one flexible flat cable; and the voltage supply circuit and the high-potential voltage sensing circuit are configured to operate only while the power supply circuit is turned on.

6. The display apparatus of claim 1, wherein:

the source printed circuit board further includes a second feedback driving voltage line branched from the second driving voltage line; and a first feedback driving voltage line, among the at least one first feedback driving voltage line, is electrically connected to the second feedback driving voltage line through the flexible flat cable.

7. The display apparatus of claim 1, wherein:

the at least one flexible flat cable includes a plurality of flexible flat cables; and the first driving voltage line and the at least one first feedback driving voltage line are electrically connected to the plurality of flexible flat cables.

8. The display apparatus of claim 7, wherein the at least one second driving voltage line branched from the first driving voltage line includes a plurality of second driving voltage lines electrically connected to the plurality of flexible flat cables, respectively.

9. The display apparatus of claim 7, wherein the at least one first feedback driving voltage line includes a plurality of first feedback driving voltage lines joined and connected to a sensing node electrically connected to the power management circuit.

10. The display apparatus of claim 9, wherein:

the at least one third driving voltage line includes a plurality of third driving voltage lines;

a plurality of second feedback driving voltage lines are branched respectively from the plurality of second driving voltage lines;

a pull-up resistor is disposed in each of the plurality of first feedback driving voltage lines or in each of the plurality of second feedback driving voltage lines; and a pull-down resistor is connected between the sensing node and the ground.

11. The display apparatus of claim 1, wherein the flexible flat cable comprises:

a first drive pin electrically connected between the second-first driving voltage line and the third-first driving voltage line; and a second drive pin electrically connected between the second-second driving voltage line and the third-second driving voltage line.

12. The display apparatus of claim 11, wherein the flexible flat cable further comprises a feedback pin electrically connected to a first feedback driving voltage line, among the at least one first feedback driving voltage line.

13. A display apparatus, comprising:

a display panel including a plurality of subpixels;

a control printed circuit board including:

a first driving voltage line;

a second driving voltage line branched from the first driving voltage line;

a second-first driving voltage line and a second-second driving voltage line each branched from the second driving voltage line; and a first feedback driving voltage line;

a source printed circuit board connected to the display panel and including:

a third driving voltage line electrically connected to at least one of the subpixels; and a third-first driving voltage line, a third-second driving voltage line, and a second feedback driving voltage line each branched from the third driving voltage line; and a flexible flat cable configured to connect the source printed circuit board with the control printed circuit board, to electrically connect the second-first driving voltage line with the third-first driving voltage line, to electrically connect the second-second driving voltage line with the third-second driving voltage line, and to electrically connect the first feedback driving voltage line with the second feedback driving voltage line, wherein the control printed circuit board is configured to sense an electrical disconnection between the first feedback driving voltage line and the second feedback driving voltage line.

14. The display apparatus of claim 13, wherein:

the control printed circuit board further comprises a power management circuit;

the power management circuit comprises a high-potential voltage sensing circuit and a power supply circuit;

the power supply circuit is configured to receive power for turning on the power management circuit; and the high-potential voltage sensing circuit is electrically connected to the first feedback driving voltage line.

15. The display apparatus of claim 14, wherein:

the first feedback driving voltage line is connected to a sensing node in the control printed circuit board;

a pull-up resistor is disposed in the first feedback driving voltage line or in the second feedback driving voltage line; and a pull-down resistor is connected between the sensing node and the ground.

16. The display apparatus of claim 15, wherein the high-potential voltage sensing circuit is configured to sense a voltage at the sensing node and to turn the power supply circuit on or off based on the sensed voltage at the sensing node.

17. The display apparatus of claim 16, wherein the high-potential voltage sensing circuit is further configured to:

maintain the power supply circuit on if the sensed voltage at the sensing node is greater than or equal to a predetermined reference voltage; and turn the power supply circuit off if the sensed voltage at the sensing node is less than the predetermined reference voltage.

18. The display apparatus of claim 16, wherein:

the power management circuit further includes a voltage supply circuit configured to provide a driving voltage to the third driving voltage line via the first driving voltage line, the second driving voltage line, and the flexible flat cable; and the voltage supply circuit and the high-potential voltage sensing circuit are configured to operate only while the power supply circuit is turned on.

19. The display apparatus of claim 13, wherein the first driving voltage line and the first feedback driving voltage line are disposed respectively in different layers on the control printed circuit board.

20. The display apparatus of claim 13, wherein the flexible flat cable comprises:

a first drive pin to electrically connect the second-first driving voltage line with the third-first driving voltage line;

a second drive pin to electrically connect the second-second driving voltage line with the third-second driving voltage line; and a feedback pin to electrically connect the first feedback driving voltage line with the second feedback driving voltage line.

21. The display apparatus of claim 1, wherein, on the control printed circuit board:

the at least one second driving voltage line branched from the first driving voltage line includes a plurality of second driving voltage lines connected to and joined at an ingress node connected directly to the first driving voltage line; and the at least one first feedback driving voltage line includes a plurality of first feedback driving voltage lines joined and connected to a sensing node electrically connected to the power management circuit.

* * * * *